(12) United States Patent
Sato

(10) Patent No.: US 7,840,423 B2
(45) Date of Patent: Nov. 23, 2010

(54) INSURANCE PREMIUM RATE SETTING SUPPORT SYSTEM

(75) Inventor: Hisayoshi Sato, Tokyo (JP)

(73) Assignees: Shinko Kigyo Corp., Tokyo (JP);
Chiyoda Gravure Corp., Tokyo (JP)

( * ) Notice: Subject to any disclaimer, the term of this patent is extended or adjusted under 35 U.S.C. 154(b) by 1215 days.

(21) Appl. No.: 11/320,453

(22) Filed: Dec. 27, 2005

(65) Prior Publication Data

US 2006/0218021 A1 Sep. 28, 2006

(30) Foreign Application Priority Data

Dec. 27, 2004 (JP) ............................. 2004-377268

(51) Int. Cl.
*G06Q 40/00* (2006.01)
(52) U.S. Cl. .......................................... 705/4
(58) Field of Classification Search ...................... 705/4
See application file for complete search history.

(56) References Cited

U.S. PATENT DOCUMENTS

| 5,842,148 | A | * | 11/1998 | Prendergast et al. | ............ | 702/34 |
| 2002/0072958 | A1 | * | 6/2002 | Yuyama et al. | ............ | 705/10 |
| 2003/0033173 | A1 | * | 2/2003 | Suzuki et al. | ............ | 705/4 |
| 2003/0187704 | A1 | * | 10/2003 | Hashiguchi et al. | ............ | 705/4 |
| 2004/0186753 | A1 | * | 9/2004 | Kim et al. | ............ | 705/4 |

FOREIGN PATENT DOCUMENTS

WO  WO 01/63445  8/2001

OTHER PUBLICATIONS

Tetsuya Minakata, "A Piece of Advice for Popularizing an Earthquake Insurance," The Non-Lif Insurance Inst. of Japan, V. 59, N. 2 Aug. 1997.

Pollner John, "El Salvador: Disaster Loss Exposure and the Viability of Using Insurance or Catastrophe Bond Instruments for Financial Protection Following Natural Disasters;" The World Bank (US), Jan. 2004.

Subcommittee for Long Term Evaluation of the Earthquake Research Committee of the Headquarters for Earthquake Research Promotion, Ministry of Education, Culture, Sports, Science and Technology, "Risk Perception of Probabilisitic Seismic Hazard Map, Trial Version (for West Japan)," Mar. 2004.

\* cited by examiner

*Primary Examiner*—Jagdish N Patel
*Assistant Examiner*—Kevin Poe
(74) *Attorney, Agent, or Firm*—Abelman, Frayne & Schwab

(57) ABSTRACT

An insurance premium rate setting support system is composed of a computer and includes: a probability-increase/strong-influence location coefficient setting section which sets a probability-increase/strong-influence location coefficient by obtaining the coefficient based on a predetermined function; and an earthquake insurance premium rate computation section which computes an insurance premium rate where an increase in the earthquake occurrence probability, based on the estimated strain accumulation, is reflected by multiplying together the set probability-increase/strong-influence location coefficient and an insurance premium rate where the increase in the earthquake occurrence probability, based on the estimated strain accumulation, is not reflected.

4 Claims, 8 Drawing Sheets

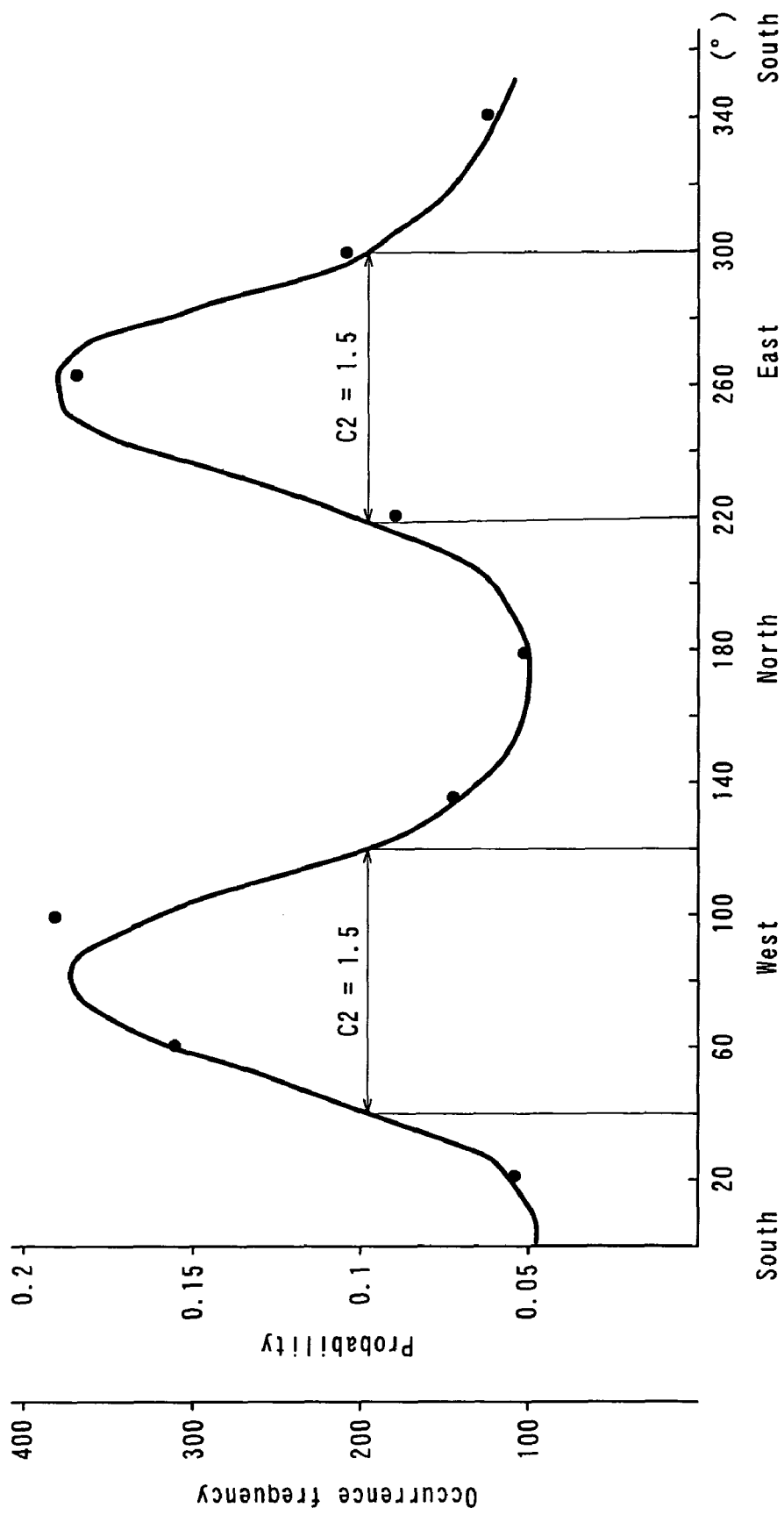

INSURANCE PREMIUM RATE SETTING SUPPORT SYSTEM

BACKGROUND OF THE INVENTION

1. Field of the Invention

This invention relates to a system which performs support for setting insurance premium rates of non-life insurance, accident insurance, and the like. In particular, this invention relates to an insurance premium rate setting support system which performs support for reasonably and effectively setting insurance premium rates based on an evaluation of an earthquake occurrence probability.

2. Description of the Related Art

In non-life insurance, which is defined herein as any insurance not covering a person's life, insurance is not intended to pay for an entire loss from an earthquake. However, in consideration of earthquakes which occurred during the past 500 years, based on seismic intensities, building destructions, destructions by fire, destructions by tsunami, and the like in those earthquakes, damages from an earthquake are calculated assuming that the same earthquake as the Great Kanto Earthquake occurs. Additionally, an insurance payout is calculated in consideration of a state of earthquake insurance contracts.

On the other hand, earthquake insurance has meaning in terms of social policy, therefore insurance companies are required to institute a mechanism referred to as "a no-loss and no-profit principle" whereby the companies neither gain profits nor suffer losses. In this institution, in each year when there has been no earthquake or when payouts have been so small in amount that surpluses have been generated in the earthquake insurance, it is required to accumulate, as a reserve, all of the surpluses. This accumulation has been conducted for the past 30 years.

As apparent from damage by the Great Kanto Earthquake and by the Great Hanshin Earthquake, damage from an earthquake has a large regional scope, and results in an enormous amount of losses. This brings about the necessity for the insurance companies to consider revenue and expenditure on an extremely long term basis in increments of 500 years. In accordance with this necessity, the necessity for insurance companies to provide insurance in view of earthquakes, besides insurance for losses which insurance companies can cover only from the economical standpoint, has been considered since the Meiji Era. Nevertheless, it was in the year 1965 with the wake of the Niigata earthquake in June 1964 as a turning point that a mechanism involving government fund injection was instituted and thereby underwriting of the insurance was realized. However, once an earthquake occurs, as one can easily expect, damages are huge. The mechanism is not intended to cover the entire amount of damage. Additionally, the mechanism has an aspect that, if an earthquake occurs before a sufficient amount of insurance is accumulated, it becomes dysfunctional. With the above background, in the case of the Great Hanshin Earthquake, insurance payouts were made from a government fund in addition to accumulated insurance.

In the case of the Great Hanshin Earthquake, concrete roadbeds of railroads for the Shinkansen collapsed, and an express motorway fell down due to collapse of supports thereof. Since the earthquake occurred early in the morning, the time was before the first Shinkansen train of the day would be operated, and before car traffic would be congested. For these reasons, the Shinkansen did not sustain damage of derailment and overturn, and as well, the motorway remained with the minimum damage. In the case of the Chuetsu earthquake, however, the Shinkansen was not able to avoid derailment although an emergency stop system, which utilizes an arrival time difference of P and S waves, went into operation. The state where a Shinkansen train sustained only derailment without damage to its passengers was lucky that it was not worse.

So far, the Shinkansens have achieved records of no accident in past years. Then, despite of the experience with the Great Hanshin Earthquake, it appears that safety of the Shinkansens has been appraised. On the other hand, when the reality is faced, insurance is considered to be an appropriate provision for the purpose of covering risks both for a transport operating company and for users (passengers) thereof. The same can be also applied to a situation of an individual passenger. In reality, however, in the case of travel accident insurance, damage from an earthquake is excluded from coverage. Based on the background of no accident in the past since the start of operation of the Shinkansens, there is a high possibility that damage to one insured thereby will be caused by an earthquake. By taking that high possibility into consideration, it may be considered that the insurance ends up having no meaning.

A current situation is that a reliable prediction for an earthquake occurrence is still far from being realized, and one should not count on simply carrying out disaster prevention measures by placing high expectations on the prediction. However, it has been made possible to estimate a progress of strain accumulation in an overall view as an earthquake occurrence possibility in a future time period with reference to a past history of earthquake occurrences. This issue is described for instance in "Kyodai Jishin (Great Earthquake)" (written by Tsuneji Rikitake, published in 1976 in the Blue Backs series by Kodansya Ltd.). Specifically, as shown in FIG. 3, a probability that an earthquake having the same level as the Great Kanto Earthquake occurs after the Great Kanto Earthquake has been creeping up and is definitely increasing since a time point immediately after the Great Kanto Earthquake. The probability mentioned as above is estimated based on a history regarding earthquake occurrences in surrounding areas of the past and based on the number of years elapsed after the earthquake, in consideration of various properties of earthquakes such as one generated in association with a plate movement estimated in the Pacific Ocean coastal region, and one generated by an active fault in an inland region. FIG. 4 shows results announced by a government research committee, and it is indicated therein that a probability of earthquake occurrence has become considerably high in the South Kanto area. This issue is described for instance in the Aug. 24, 2004 edition of the Ashahi Shinbun.

Incidentally, it has been conventionally possible to obtain earthquake insurance at the time of purchasing fire insurance, as an addition to the fire insurance. Nevertheless, in a case of insuring a house, an amount covered by earthquake insurance is limited to the lower one of an amount limited to 50 million yen and 30 to 50% of an amount covered by the fire insurance to which the earthquake insurance is added. Moreover, insurance premium rates are defined by the Property and Casualty Insurance Rating Organization as shown in FIG. 5 corresponding to classification by 4 phases depending on earthquake shaking intensities (seismic intensities) estimated for all parts of the country, the intensities having been calculated based on past earthquake histories of the respective parts. Table 1 as follows shows definitions corresponding to this classification with respect to each building type. This issue is described for instance in page 144 of "Gendai no Risk to Hoken (Modem Risk and Insurance)" (written by Mitsutsune Yamaguchi, published in 1988 by Iwanami-Shoten).

TABLE 1

Earthquake insurance premium rate table
(insurance coverage of 1,000 yen per one year of insurance term)

|  | Non-wooden | Wooden |
|---|---|---|
| Rank 1 area | 0.50 yen | 1.45 yen |
| Rank 2 area | 0.70 yen | 2.00 yen |
| Rank 3 area | 1.35 yen | 2.80 yen |
| Rank 4 area | 1.75 yen | 4.30 yen |

Nevertheless, since, in the wake of an earthquake, specification of concerned areas thereof is needed and an enormous amount of damages is caused, the insurance mechanism thus defined cannot work as a mechanism only with non-life insurance companies being responsible for underwriting the insurance. Therefore, owing to reinsurance therefor established by the Japanese government, the mechanism has been made functional. In 1966 when earthquake insurance underwriting was started, a total payout limit for one earthquake was 300 billion yen. Since a total asset of the non-life insurance companies at the time was 350 billion yen, it would have been impossible to start earthquake insurance underwriting without a political measure of the government.

In the total payout limit, the government and the non-life insurers were set to bear 270 billion yen and 30 billion yen respectively. In the recent years, the total payout limit has been raised to 3,700 billion yen, and shares therein of the government and the non-life insurers have been set to be 3,197.45 billion yen and 502.55 billion yen respectively. In the 30 years since the mechanism was instituted, a reserve fund therefor had been accumulated to be 842 billion yen, which is broken down into 478.6 billion yen by the government and 363.4 billion yen by the non-life insurers. Incidentally, the reinsurance purchased by the government includes a condition that the reinsurance is effective for damages of a predetermined amount or larger, and it is reported that it was used for the first time when a total amount of 78 billion yen was paid out in the occasion of the Great Hanshin Earthquake. This issue is described for instance in the chapter 3 of "Gendai no Risk to Hoken".

As mentioned hereinabove, there are a number of unsolved problems relating to the mechanism of earthquake occurrence, and there are problems in insurance coverage for damages caused by an earthquake, including a problem that, since there involve uncertainty of occurrence time thereof and the enormousness of damages caused once the earthquake occurred, the insurance coverage does not work without budgetary steps taken by the government. Even with these problems, nevertheless, insurance is an essential countermeasure for the purpose of keeping a reserve for and covering a risk from an earthquake. With these taken into consideration, for an insured one expecting risk aversion, for a non-life insurance company intending to reasonably structure an insurance mechanism to acquire more insured ones, and furthermore, for the government pressed to reduce a financial burden as much as possible, essential requirements are: to structure means for setting insurance premium rates as reasonably as possible based on facts confirmed to be considerably reliable; to enhance a penetration rate of earthquake insurance, which was only 12.6% in the year 1996; and to structure a social constitution resistant to disasters as reasonably as possible.

BRIEF SUMMARY OF THE INVENTION

Accordingly, when the inventor of the present application examined a conventional method of setting insurance premium rates, the following was found. Conventionally, as mentioned previously, if a location covered by insurance is determined, an area rank is determined according to FIG. 5 and then an insurance premium rate is set depending on the area rank as shown in Table 1. Therefore, in the conventional method, even in the areas as shown in FIG. 4 in each of which an earthquake occurrence probability is estimated to have increased by strain accumulation along a plate boundary or along a fault, insurance premium rates are set without consideration of increases in the probabilities.

On the other hand, although it is difficult to accurately estimate in what stage of the increases in the respective probabilities are at the current point of time, it is, at present, possible to show differences among earthquake occurrence probabilities of the respective locations considerably in detail. Consequently, if this point is taken into consideration, regardless of how coefficients corresponding to increases in the probabilities are set to which probabilities, it is considered reasonable that, as shown in FIG. 6, insurance premium rates be provided by setting stages for a coefficient $C_1$ regarding an increase in an earthquake occurrence probability due to the strain accumulation as in the case with the area rank assignment.

Furthermore, based on research conducted in recent years by the inventor of the present application and others by studying historical earthquakes according to "Rika Nenpyo (Chronological Scientific Tables)" and by using astronomical software ("STELLA NAVIGATOR" marketed by ASCII Corporation in 1997), it was found that there is a phenomenon where an earthquake occurrence probability becomes high during a time range when a direction of the moon from the center of an earthquake is either east or west. This issue is described for instance in "Jishin-hassei to Tsuki no Undou tono Kanren, Ichi-kousatsu (One Consideration on Relationship between Earthquake Occurrence and Movement of the Moon)" (written by Hisayoshi Sato and three others in Collected Lectures and Papers in the Mechanical Dynamics and the Instrument and Control Vol. A in the Japan Society of Mechanical Engineers (No. 98-8 I), published in 1998). Specifically, when an investigation on directions of the moon, that is, locations of the moon in the sky viewed from the centers of the earthquakes at the times of occurrences thereof was conducted by using the above astronomical software with respect to 871 samples in the year 1945 and after, and 1,080 samples from the years 1900 to 1944 among large earthquakes having magnitudes more than 7 described in "Rika Nenpyo," the results were turned out as shown in FIGS. 7 and 8 respectively. In these drawings, horizontal axes indicate directions of the moon and vertical axes indicate earthquake occurrence probabilities, and in each of the horizontal axes, "90 degrees" means "west," and "270 degrees" means "east." Both of the drawings shows that, when the moon came to east and to west, earthquake occurrence frequencies were higher, that is, earthquake occurrence probabilities were made higher. Based on results of this investigation, it can be said that, twice a day, an earthquake occurrence probability increases during time ranges of moonrise and moonset.

A background for conducting the investigation comes from an interest desiring to make clear what a triggering effect for actually causing the break depends on, if it should be assumed that an earthquake is a phenomenon where, after strains have been accumulated on the earth's crust by plate movements, the land surrounding the strains is broken when rocks thereof has reached their resistance limits. In consideration of a mutual relationship between the earth and the moon, and on the assumption that the center of an earthquakes is located relatively to the earth, it is a qualitatively understandable phenomenon that an external force due to gravity of the moon becomes the largest in the center of the earthquake when the moon is situated either in east or in west from the location thereof. Accordingly, it is considered reasonable that, as shown in FIG. 9, a coefficient C2 regarding an increase in an earthquake occurrence probability due to a location of the moon be provided as in the case with the area rank assignment.

An object of this invention is to advantageously solve the problems in the conventional insurance premium rate setting method in consideration of the above points. An insurance premium rate setting support system of this invention is composed of a computer, and includes: probability-increase/strong-influence location coefficient setting means which, if an inputted covered location of earthquake insurance is specified as a probability-increase/strong-influence location located in any one of an area for which an earthquake occurrence probability has increased to not less than a predetermined probability based on estimated strain accumulation along at least one of a plate boundary and a fault due to a period having elapsed since a past earthquake occurrence, and an area having a risk of being strongly influenced by an earthquake occurrence in the area for which the earthquake occurrence probability has increased to not less than the predetermined probability, which sets a probability-increase/strong-influence location coefficient by obtaining it based on a predetermined function whereby the coefficient increases in a stepwise manner following an increasing characteristic of an earthquake occurrence probability with respect to a period having elapsed since the past earthquake occurrence in the location covered by the earthquake insurance; and earthquake insurance premium rate computation means which computes an insurance premium rate where the earthquake occurrence probability increase, based on the estimated strain accumulation, is reflected, by multiplying together the set probability-increase/strong-influence location coefficient and an insurance premium rate where the earthquake occurrence probability increase, based on the estimated strain accumulation, is not reflected.

An insurance premium rate setting support system of this invention is composed of a computer, and includes: traveling time range judgment means for judging whether an inputted time range of traveling in a covered journey of travel accident insurance is a moon influence time range falling in a predetermined time period, around any one of a moonrise and a moonset in a location visited during the traveling, during which an earthquake occurrence probability for the location increases to not less than a predetermined probability; moon influence coefficient setting means for setting a moon influence coefficient of the journey if the time range of traveling is the moon influence time range; and travel accident insurance premium rate computation means for computing an insurance premium rate where the earthquake occurrence probability increase around any one of a moonrise and a moonset is reflected, by multiplying together the set moon influence coefficient, and an insurance premium rate where the earthquake occurrence probability increase around any one of a moonrise and a moonset is not reflected.

In the insurance premium rate setting support system, on condition that, with a location covered by earthquake insurance being inputted, the location is specified, by any one of an operator of the system, an user thereof, earthquake insurance covered-location judgment means described below and the like, as a location (which is referred to as a "probability-increase/strong-influence location" in this specification) located in any one of an area for which an earthquake occurrence probability has increased to not less than a predetermined probability based on estimated strain accumulation along at least one of a plate boundary and a fault due to a period having elapsed since a past earthquake occurrence, and an area having a risk of being strongly influenced by an earthquake occurrence in the area for which the earthquake occurrence probability has increased to not less than the predetermined probability, the probability-increase/strong-influence location coefficient setting means sets a current probability-increase/strong-influence location coefficient for the location by obtaining it based on a predetermined function whereby the coefficient increases in a stepwise manner following an increasing characteristic of an earthquake occurrence probability with respect to a period having elapsed since the past earthquake in the location covered by the earthquake insurance. Subsequently, the earthquake insurance premium rate computation means computes an insurance premium rate where the increase of the earthquake occurrence probability based on the estimated strain accumulation is reflected, by multiplying together the set probability-increase/strong-influence location coefficient and an insurance premium rate for the location set where the earthquake occurrence probability increase, based on the estimated strain accumulation, is not reflected.

Thus, according to the insurance premium rate setting support system of this invention, in a case where a location covered by an earthquake insurance added to fire insurance or independently contracted is a probability-increase/strong-influence location located in any one of an area for which an earthquake occurrence probability has increased to not less than a predetermined probability based on estimated strain accumulation along at least one of a plate boundary and a fault due to a period having elapsed since a past earthquake occurrence, and an area having a risk of being strongly influenced, due to a type of the ground thereof, by an earthquake occurrence in the area for which the earthquake occurrence probability has increased to not less than the predetermined probability, an insurance premium rate for the location where a degree of the increase of the earthquake occurrence probability is reflected is computed. Therefore, it becomes possible to reasonably and effectively set insurance premium rates of earthquake insurance based on earthquake occurrence probability evaluations.

Note that, in the insurance premium rate setting support system of this invention, earthquake insurance covered-location judgment means may be provided. The earthquake insurance covered-location judgment means judges, for example, from previously provided data, whether an inputted location covered by earthquake insurance is a probability-increase/strong-influence location located in any one of an area for which an earthquake occurrence probability has increased to not less than a predetermined probability based on estimated strain accumulation along at least one of a plate boundary and a fault due to a period having elapsed since a past earthquake occurrence, and an area having a risk of being strongly influenced by an earthquake occurrence in the area for which the earthquake occurrence probability has increased to not less than the predetermined probability. Subsequently, if a result of the judgment is that the location is a probability-increase/strong-influence location, the earthquake insurance covered-location judgment means designates the intent to the probability-increase/strong-influence location coefficient setting means. By configuring the system as above, it becomes possible to easily and accurately judge whether or not an inputted location covered by earthquake insurance is a probability-increase/strong-influence location, and then, if the judgment result is that the location is the probability-increase/strong-influence location, to address that intent to the probability-increase/strong-influence location coefficient setting means.

In the insurance premium rate setting support system of this invention, insurance premium rate selection-purpose output means may be provided. The insurance premium rate selection-purpose output means outputs the insurance premium rate computed by the earthquake insurance premium rate computation means, and the insurance premium rate where the increase in the earthquake occurrence probability is not reflected, and thereby allows a purchaser of earthquake insurance to purchase insurance with one of the foregoing insurance premium rates, the one being spontaneously selected by the purchaser. By configuring the system as above, a purchaser of earthquake insurance is allowed to purchase insurance with an insurance premium rate selected from these insurance premium rates based on a judgment at the purchaser's own risk. Note that, normally, when one selects in earthquake insurance an insurance premium rate where an increase in an earthquake occurrence probability is not reflected, an upper limit of an insurance payout is suppressed to an amount lower than that in the case of selecting an insurance premium rate where the earthquake occurrence probability increase is not reflected.

In an insurance premium rate setting support system, when a time range of traveling in a covered journey of travel accident insurance is inputted, the time range judgment means judges whether the inputted time range of traveling in the covered journey in the travel accident insurance is a moon influence time range which is within a predetermined time period, around any one of a moonrise and a moonset in a location visited during the traveling, during which an earthquake occurrence probability increases to not less than a predetermined probability. Then, if the time range of traveling is the moon influence time range, the travel accident insurance premium rate computation means computes an insurance premium rate where the earthquake occurrence probability increase around the one of the moonrise and the moonset is reflected, by multiplying together: a moon influence coefficient set by the moon influence coefficient setting means for setting a moon influence coefficient of the journey; and an insurance premium rate where the earthquake occurrence probability increase around the one of the moonrise and the moonset is not reflected.

Thus, according to the insurance premium rate setting support system of this invention, in the case where a time range of traveling by means of any one of land transport, water transport and an airplane in a journey covered in travel accident insurance is a moon influence time range falling in a predetermined time period, around any one of a moonrise and a moonset in a location visited during the traveling, during which an earthquake occurrence probability increases to not less than a predetermined probability, an insurance premium rate where the earthquake occurrence probability increase is reflected is computed. Therefore, it becomes possible to reasonably and effectively set insurance premium rates of travel accident insurance based on earthquake occurrence probability evaluations.

Note that, in the insurance premium rate setting support system of this invention, the moon influence coefficient setting means may be one which sets the moon influence coefficient based on a predetermined function whereby the coefficient decreases in a stepwise manner following a decreasing characteristic of an earthquake occurrence probability with respect to a periodical distance from each of a moonrise and a moonset. By configuring the system as above, it becomes possible to determine insurance premium rates where degrees of earthquake occurrence probability increases are reflected.

Furthermore, in the insurance premium rate setting support system of this invention, insurance premium rate selection-purpose output means may be provided. The insurance premium rate selection-purpose output means outputs the insurance premium rate computed by the travel accident insurance premium rate computation means, and the insurance premium rate where the earthquake occurrence probability increase is not reflected, and thereby allows a purchaser of the insurance to purchase it with one of the foregoing insurance premium rates, the one being spontaneously selected by the purchaser. By configuring the system as above, a purchaser of the insurance is allowed to purchase it with an insurance premium rate selected from these insurance premium rates based on a judgment at the purchaser's own risk. Note that, normally, when one selects, in travel accident insurance, an insurance premium rate where an increase in an earthquake occurrence probability is not reflected, damages from an earthquake are excluded from coverage of the insurance.

BRIEF DESCRIPTION OF THE DRAWINGS

FIG. 9 is a relation chart showing a stepwise function for a moon influence coefficient C2 along a curve for a probability based on the occurrence frequencies of earthquakes at the magnitudes not less than 7 with respect to visual positions of the moon shown in FIGS. 7 and 8.

DETAILED DESCRIPTION OF THE INVENTION

Figure 1:
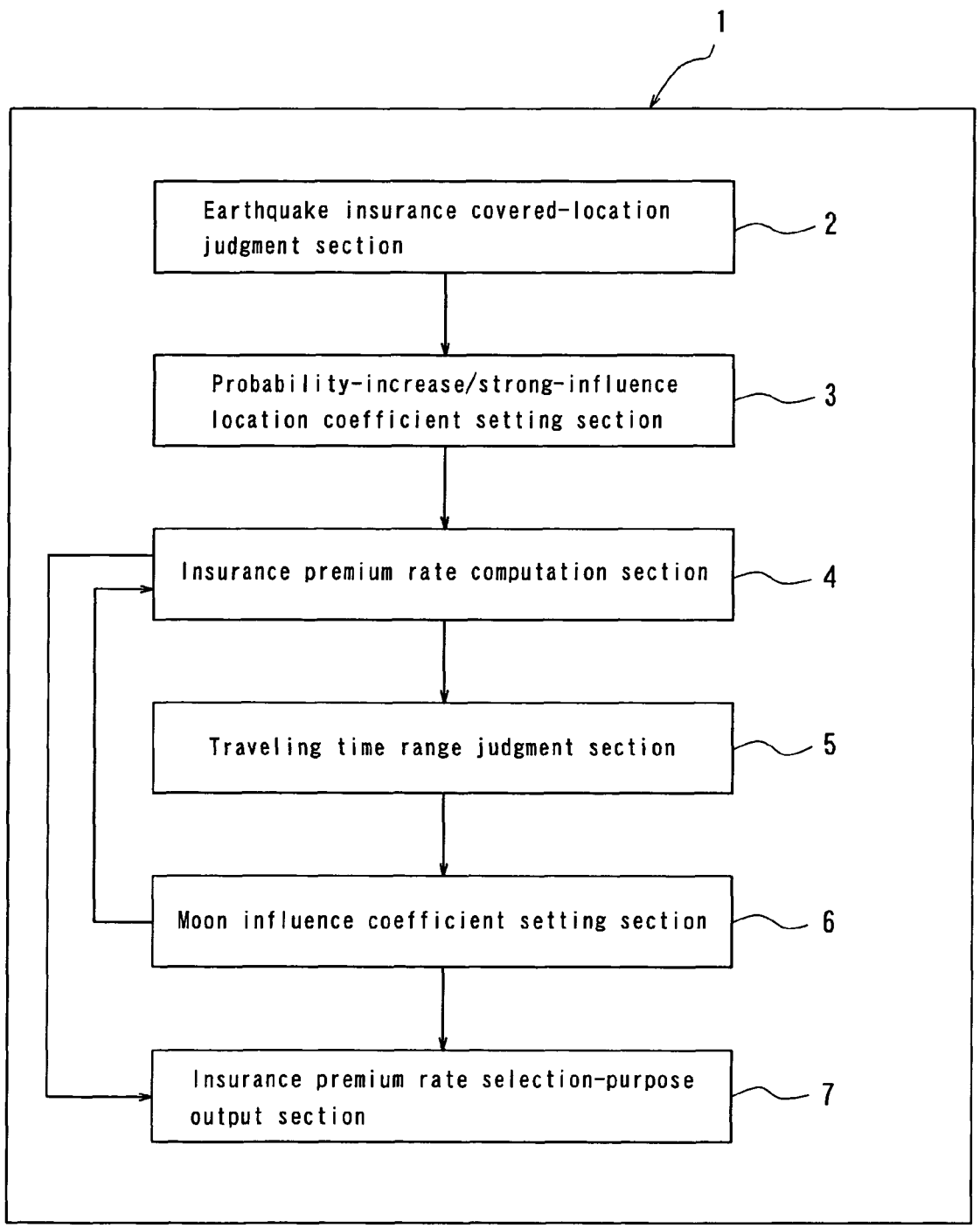
FIG. 1 is a block diagram showing a configuration of one example of insurance premium rate setting support systems of this invention by way of functional blocks.
Figure 2:
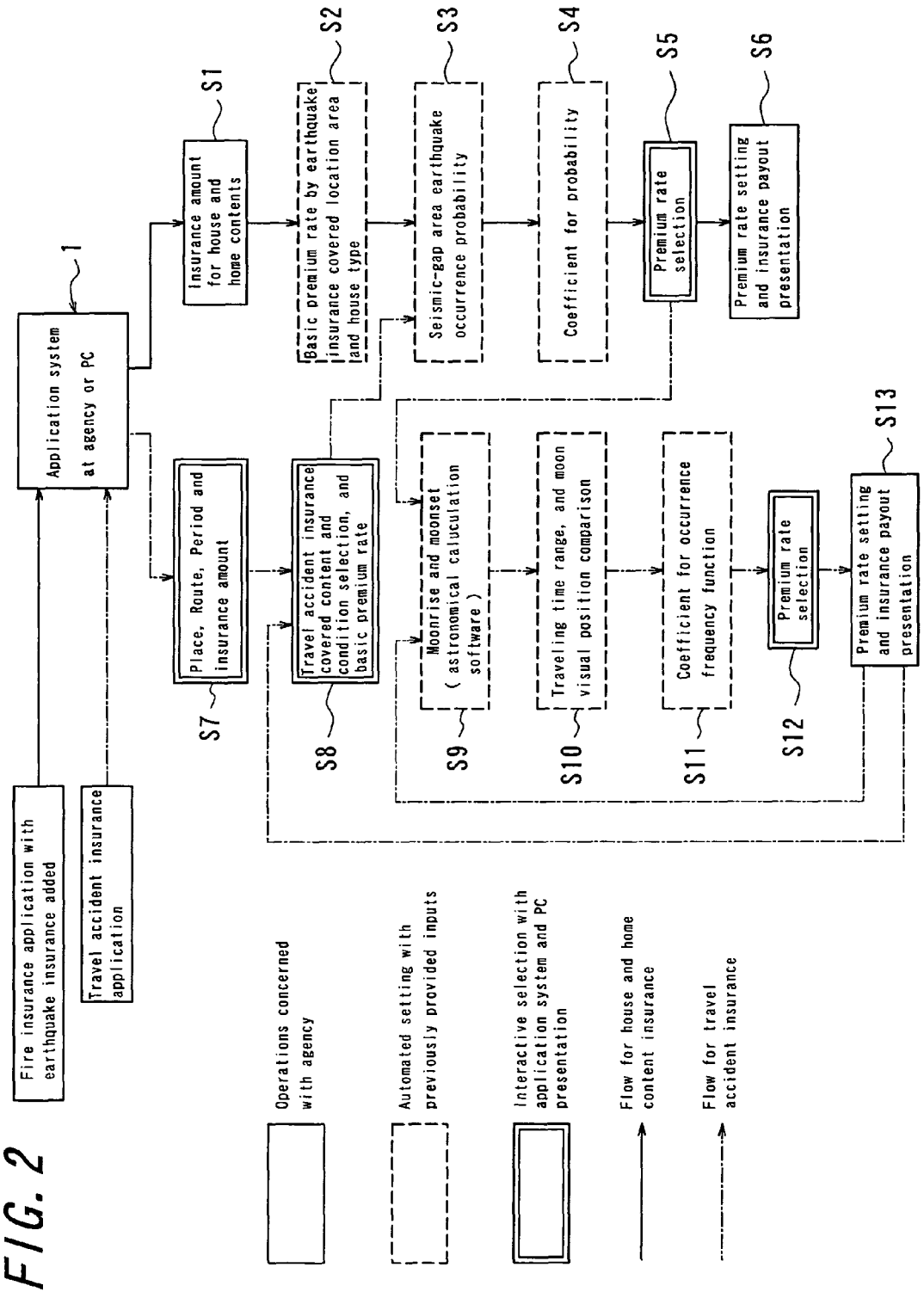
FIG. 2 is a flowchart showing a flow of processing in an insurance premium rate setting support system of the above example.

Hereinbelow, an embodiment of this invention will be described in detail by way of an example based on the drawings. Here, FIG. 1 is a block line diagram showing a configuration of one example of insurance premium rate setting support systems of this invention by way of functional blocks, and FIG. 2 is a flowchart showing a flow of processing in an insurance premium rate setting support system of the example. In these drawings, reference numeral 1 denotes the insurance premium rate setting support system of the example.

The insurance premium rate setting support system 1 is constituted of a regular computer having a central processing unit (CPU), a basic memory unit such as a memory, an additional memory unit such as a hard disk drive unit, an input unit such as a mouse or a keyboard, and an output unit such as a display unit. By having the computer operating based on a predetermined program, the insurance premium rate setting support system 1 is functionally provided with: an earthquake insurance covered-location judgment section 2 as earthquake insurance covered-location judgment means; a probability-increase/strong-influence coefficient setting section 3 as probability-increase/strong-influence coefficient setting means; an insurance premium rate computation section 4 as earthquake insurance premium rate computation means and travel accident insurance premium rate computation means: a traveling time range judgment section 5 as traveling time range judgment means; a moon influence coefficient setting section 6 as moon influence coefficient setting means; and an insurance premium rate selection-purpose output section 7 as insurance premium rate selection-purpose output means.

Note that, as a computer as described above, what is called an insurance application system constituted of a workstation, a minicomputer, a server, or the like, and a home-use desktop or notebook personal computer (PC), which can be used for insurance applications through the Internet, can be used.

Here, the earthquake insurance covered-location judgment section 2 judges, from previously provided data, whether or not an inputted covered location of earthquake insurance is a "probability-increase/strong-influence location" located in any one of an area (a seismic gap area) for which, up to the present time, an earthquake occurrence probability has increased to not less than a predetermined probability based on estimated strain accumulation along at least one of a plate boundary and a fault due to a period having elapsed since a past earthquake occurrence, and an area having a risk of being strongly influenced by an earthquake occurrence in the area for which the earthquake occurrence probability has increased to not less than the predetermined probability. Subsequently, if a result of the judgment is that it is a "probability-increase/strong-influence location," the earthquake insurance covered-location judgment section 2 designates the intent to the probability-increase/strong-influence location coefficient setting section 3.

Furthermore, if the inputted covered location of earthquake insurance is designated as a probability-increase/strong-influence location by the earthquake insurance covered-location judgment section 2, the probability-increase/strong-influence location coefficient setting section 3 sets a current probability-increase/strong-influence location coefficient for the covered location of earthquake insurance by obtaining it based on a predetermined function whereby the coefficient increases in a stepwise manner following an increasing characteristic of an earthquake occurrence probability with respect to a period having elapsed since a past earthquake of the covered location of earthquake insurance. Then, the earthquake insurance premium rate computation section 4 computes an insurance premium rate where the earthquake occurrence probability increase, based on the estimated strain accumulation, is reflected, by multiplying together the set probability-increase/strong-influence location coefficient and an insurance premium rate where the earthquake occurrence probability increase, based on the estimated strain accumulation, is not reflected.

On the other hand, the traveling time range judgment section 5 judges whether or not an inputted time range of traveling in a covered journey of travel accident insurance is a moon influence time range which is within a predetermined time period around any one of a moonrise and a moonset in a location visited during the traveling, during which an earthquake occurrence probability increases to not less than a predetermined probability. Then, if the inputted time range of traveling in a covered journey of the travel accident insurance has been found to be the moon influence time range as a result of the judgment, the moon influence coefficient setting section 6 sets a moon influence coefficient for the journey. Subsequently, the travel accident insurance premium rate computation section 4 computes an insurance premium rate where the earthquake occurrence probability increase around the one of the moonrise and the moonset is reflected, by multiplying together the set moon influence coefficient and an insurance premium rate where the earthquake occurrence probability increase around the one of the moonrise and the moonset is not reflected.

The insurance premium rate selection-purpose output means 7 outputs both of the insurance premium rate computed by the earthquake insurance premium rate computation section 4 and the insurance premium rate where the earthquake occurrence probability increase is not reflected, and thereby allows a purchaser of earthquake insurance to purchase the insurance with one of the foregoing insurance premium rates, the one being spontaneously selected by the purchaser.

Figure 5:
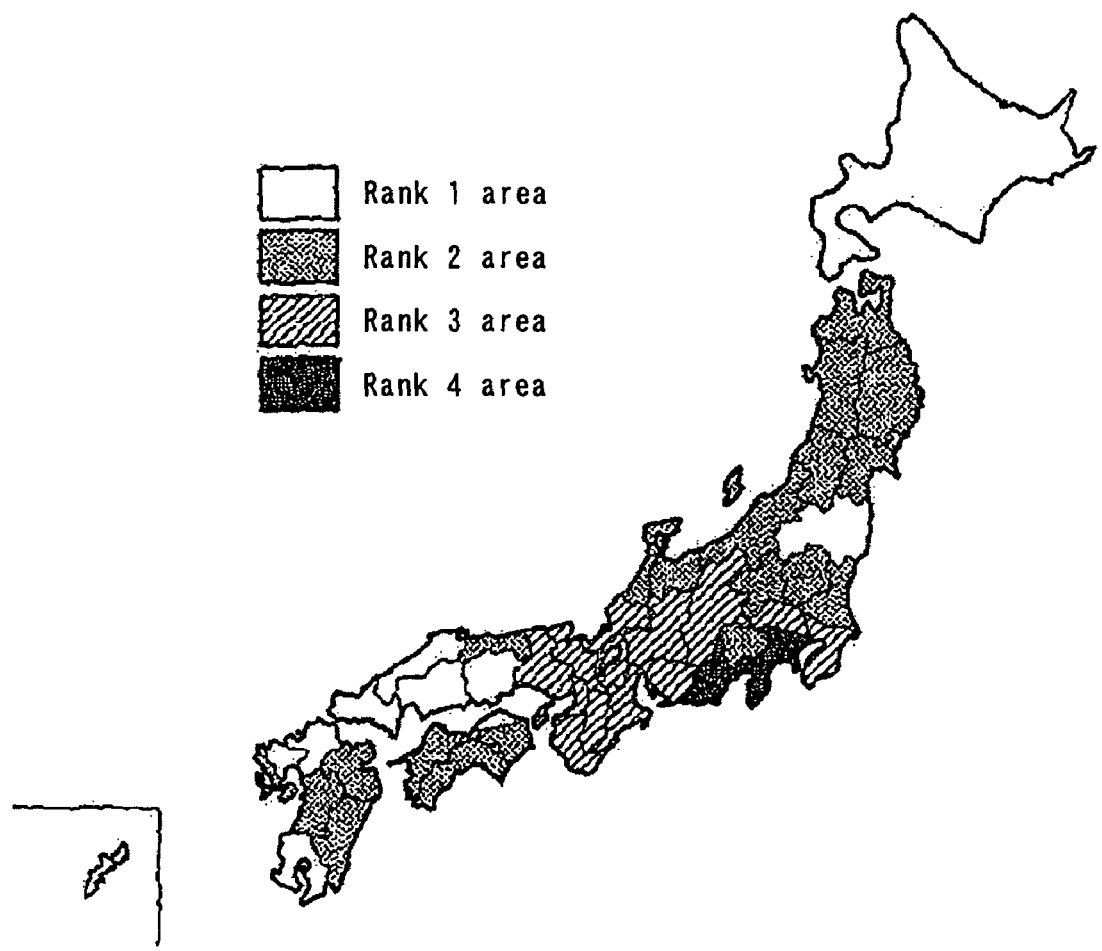
FIG. 5 is an illustration showing a conventional method of setting insurance premium rate for earthquake insurance.

Processing related to the example will be specifically described based on FIG. 2 as follows. On an occasion of an application for earthquake insurance added to a fire insurance contract, the application is indicated by an arrow of the solid line in FIG. 2. First, in Step S1, an applicant decides a desired insurance amount with respect to what is covered by the earthquake insurance, the desired insurance amount is inputted by the applicant or a representative of an insurance agency, and furthermore, an area (a location) where a house covered by the earthquake insurance is located, and the type of house are inputted. Step S1 is followed by Step S2 where, with reference to the area where the house is located and to the type of house, the system of the example sets a basic premium rate, as has been done to date, in compliance with a predetermined manual based on FIG. 5 and Table 1 shown as above.

Figure 3:
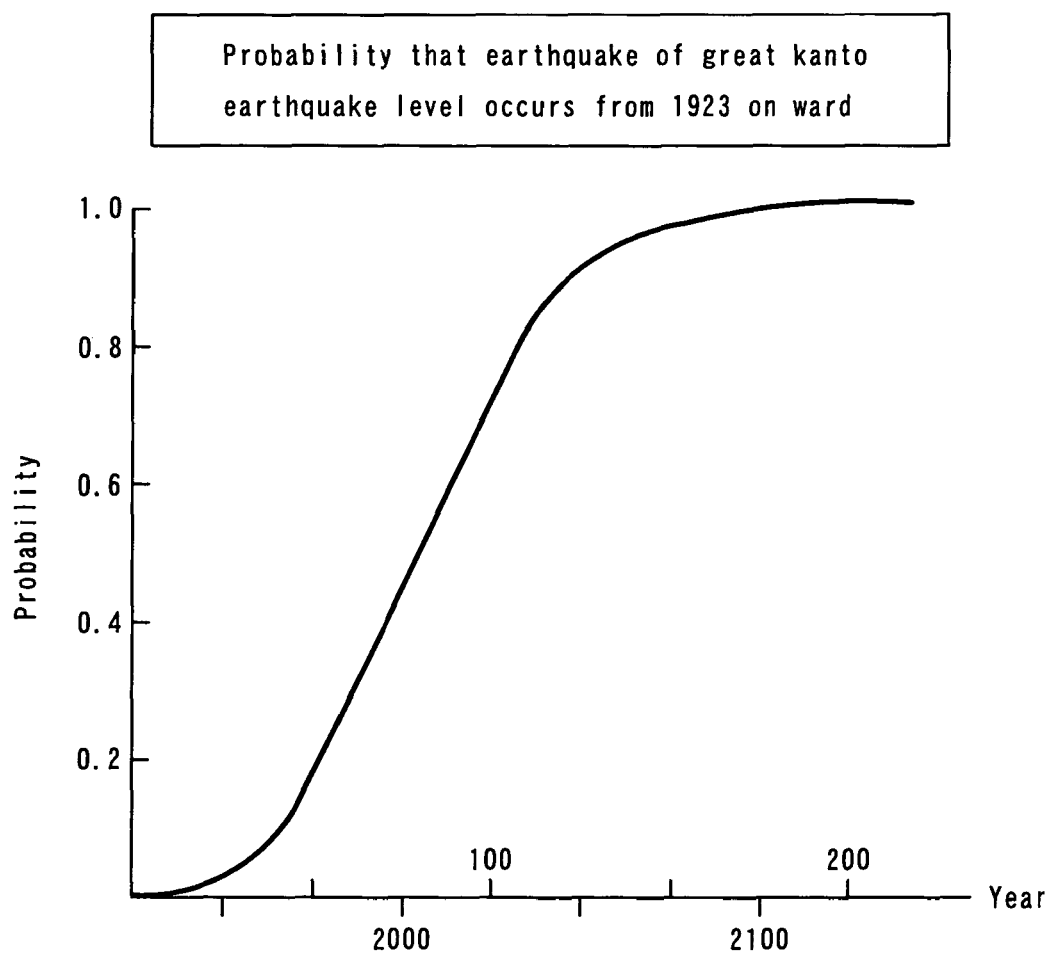
FIG. 3 is a characteristic chart showing chronological changes since the year 1923 in a probability that an earthquake of the Great Kanto Earthquake level occurs in the South Kanto area.

Subsequently, in Step S3, the system of this example, using the earthquake insurance covered-location judgment section 2, judges whether or not the inputted location where the house covered by the earthquake insurance is the probability-increase/strong-influence location located in any one of: an area (a seismic gap area) for which, up to the present time, an earthquake occurrence probability has increased to not less than a predetermined probability (for example, 0.3) based on estimated strain accumulation along at least one of a plate boundary and a fault due to a period having elapsed since a past occurrence of an earthquake having a predetermined magnitude (for example, a large earthquake having a magnitude not less than 7); and an area having a risk of being strongly influenced by an earthquake occurrence in the area for which the earthquake occurrence probability has increased. The system judges it from data on a state of chronological changes in the earthquake occurrence probability given for each location, the data being, for example, what is shown in FIG. 3 with respect to the South Kanto area.

Figure 4:
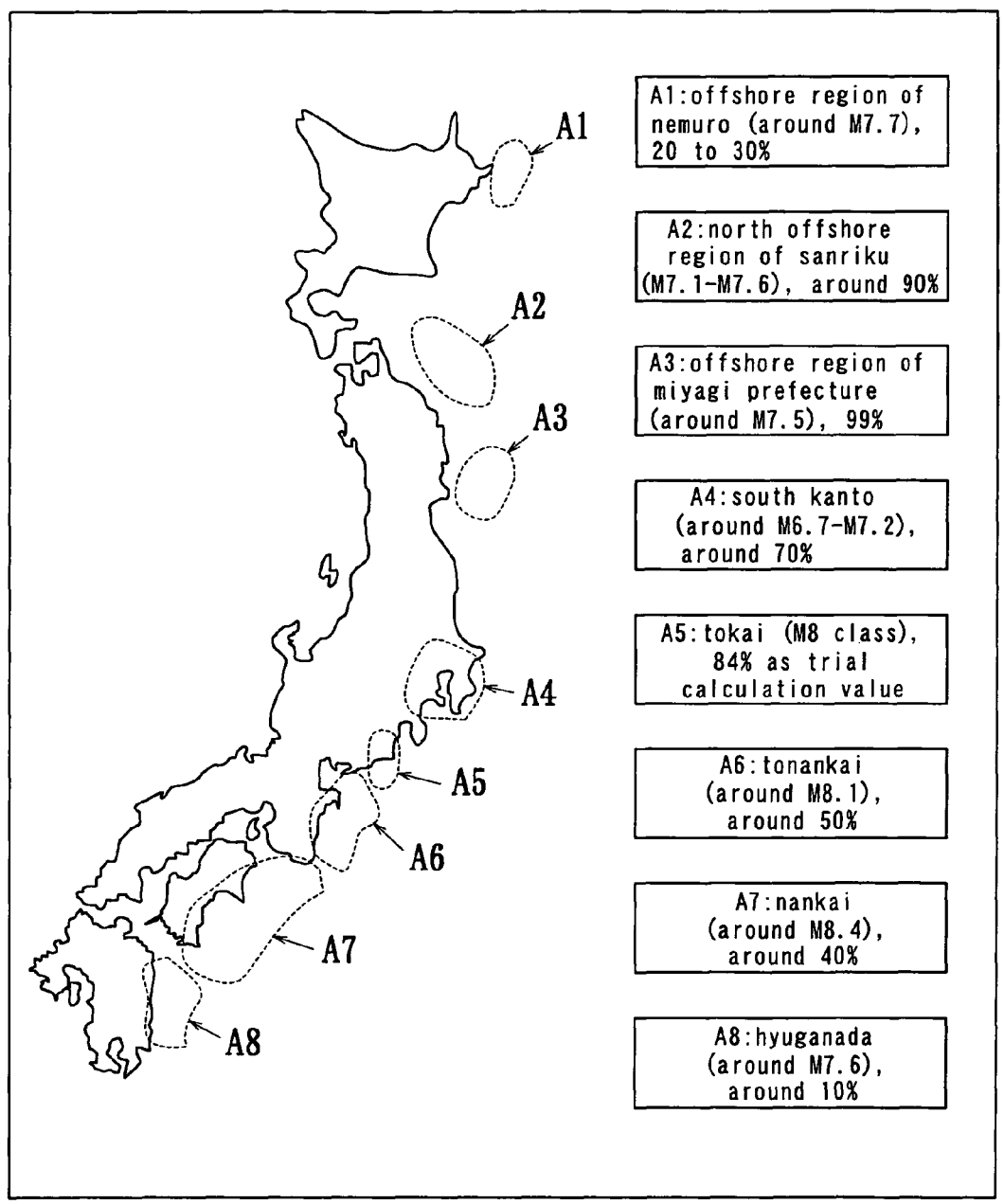
FIG. 4 is an illustration showing distributions of areas having relatively high probabilities of earthquake occurrence throughout Japan.
Figure 6:
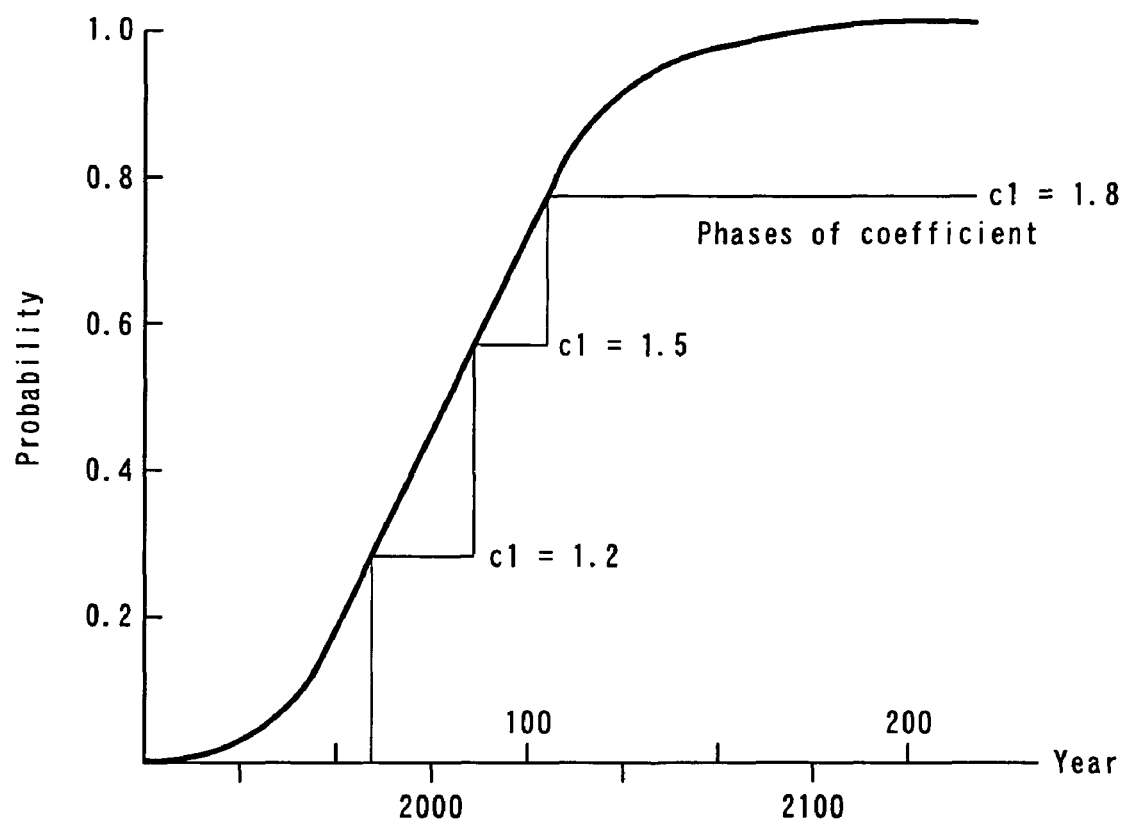
FIG. 6 is a relation chart showing a stepwise function, in the insurance premium rate setting support system of the above example, for a probability-increase/strong-influence location coefficient C1 along a curve for the earthquake occurrence probability shown in FIG. 3.
Figure 7:
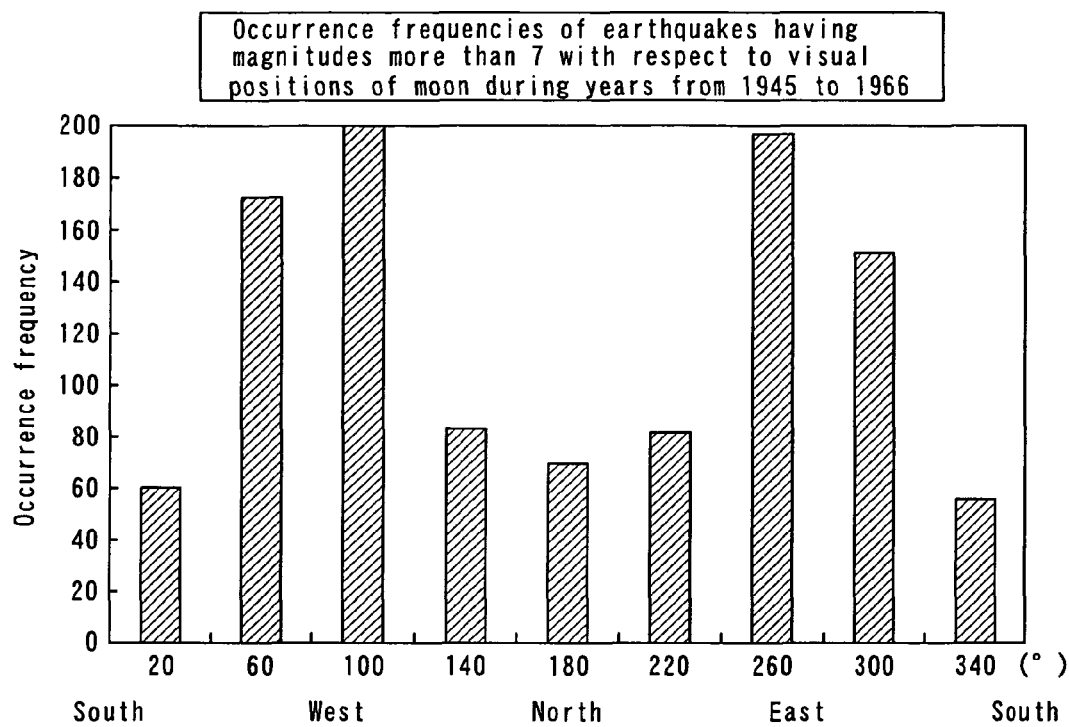
FIG. 7 is a relation diagram showing occurrence frequencies of earthquakes at the magnitudes not less than 7 with respect to visual positions of the moon during the years from 1945 to 1966.
Figure 8:
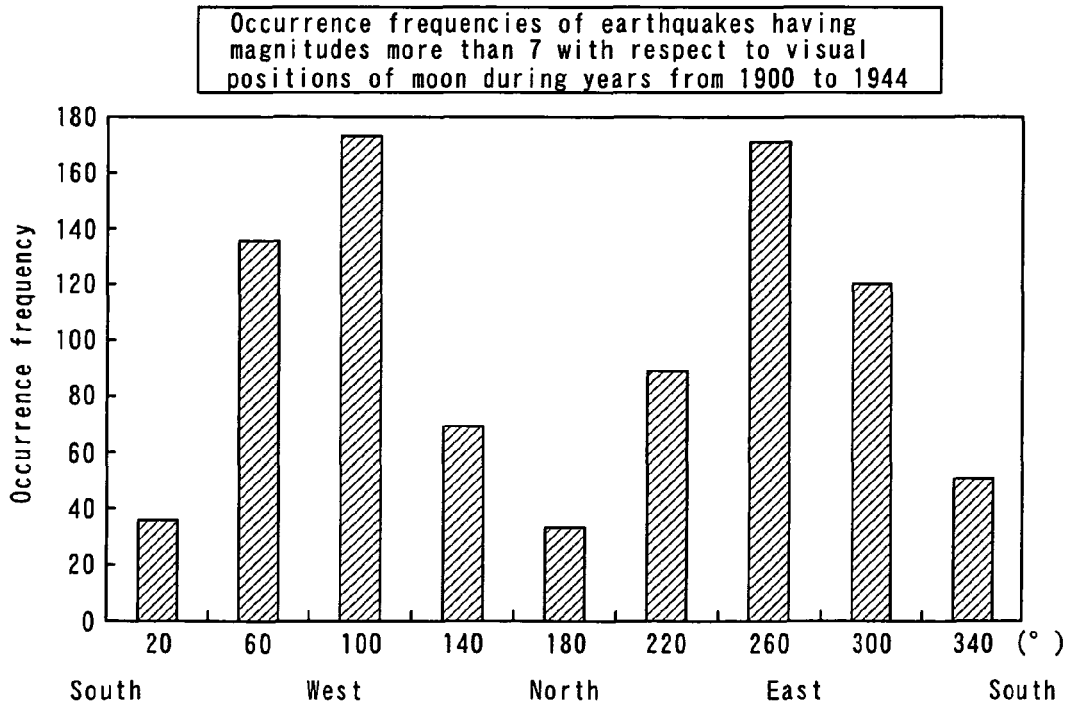
FIG. 8 is a relation diagram showing occurrence frequencies of earthquakes at the magnitudes not less than 7 with respect to visual positions of the moon during the years from 1900 to 1944.

Subsequently in Step S4, the system of this example, using the "probability-increase/strong-influence location coefficient setting section 3, sets a current probability-increase/strong-influence location coefficient C1 for the area where the building covered by the earthquake insurance is located. As shown in FIG. 6, the system sets the coefficient C1 by obtaining it, for example, in a manner that C1=1.2 at the time in the year 2004, based on a stepwise predetermined function whereby the coefficient C1 increases along an increasing characteristic of an earthquake occurrence probability with respect to a period having elapsed since the past earthquake occurrence in the area where the building covered by the earthquake insurance is located. Subsequently in Step S5, the system, using the insurance premium rate computation section 4, multiplies (performs a multiplication of) the previously set basic premium rate by the probability-increase/strong-influence location coefficient C1 set in relation to the earthquake occurrence probability in the seismic gap area. Thereby, the system sets a premium rate (or a premium) which, while premising a payout from the government, incorporates marketability. Additionally on this occasion in Step S5, the system, using the insurance premium rate selection-purpose output section 7, displays, on a screen of the display unit, an illustration shown in FIG. 4 or conforming to this drawing, status of the probability shown in FIG. 6, and the like, in order that the applicant can be allowed to gain deeper understanding of a concept of the premium determination. Thereby, the applicant is allowed to make an application for the insurance by selecting a value of the coefficient C1 by which the basic premium rate is multiplied.

Specifically, even when purchasing the insurance with a larger value of the coefficient C1 is preferable after having confirmed an increase in the earthquake occurrence probability, the purchaser is allowed to purchase, by the purchaser's own choice, the insurance with a premium which is the same as in conventional earthquake insurance and obtained by using a smaller value of the coefficient (C1=1). On that occasion, it is naturally required to configure as a mechanism of the insurance one whereby an insurance payout is limited to a payout limit which is lower than in the case where the coefficient C1 is made larger than 1 based on the increase in the earthquake occurrence probability. Otherwise, an insurance payout with the increased premium may be set with reference to a relation thereof with the number of purchasers of the insurance. Step S5 described as above supports an operation where a purchaser sets a selection and makes an application by providing status of the probability in FIG. 4 and FIG. 6 displayed on a screen of the display unit, and furthermore by providing a premium rate amount thereon. Since earthquake insurance covering a house and home contents, which is added to fire insurance, tends to become large in insurance amount, it is assumed that a selection determination only through an operation on the Internet may be difficult to perform. Therefore, it is considered that, inevitably, applications for the insurance would be accepted through insurance agencies in the great majority of cases. Even in such a case, by having the above presentation on a screen of a personal computer carried by a sales representative, it become possible for the system to support insurance premium rate setting work.

On the other hand, in the case of travel accident insurance, in one reason that an insurance amount therefor is relatively small as compared with insurance covering a house and home contents, a simple purchase thereof is made possible by a dedicated terminal apparatus, for example, in an example of life insurance purchased at a boarding gate at the time of getting aboard an airplane. Additionally, sales of the insurance are also carried out as an agency operation by a travel planning company, and furthermore, sales on the Internet by a PC in a home or the like of an applicant is made possible in recent years.

On an occasion of a travel accident insurance application for which a flow is indicated by an arrow of the dashed line in FIG. 2, first, in Step S7, an applicant or a representative at a travel agency inputs, into the system of this example, items determined by an itinerary of the applicant such as destinations, routes, and periods. Furthermore in Step S8, traveling means and the like for which the applicant is going to be covered by the insurance are selected and inputted into the system. Once the above items are inputted, in Step S8 here, the system of this example sets a basic premium rate in compliance with previously provided regular insurance premium rate setting standards. These inputted items may be explained to the applicant by the representative at the agency, or, may be presented by way of charts and tables on a screen of a dedicated application-purpose terminal apparatus, or of a display unit of a PC of the applicant through a sale on the Internet. Thereby, the applicant is allowed to understand, and to make a judgment and a decision on, contents of the insurance. Note that processing of the item inputting and the basic premium rate setting can also be preformed by using a screen presentation on a PC carried by the agency representative.

Subsequently, as previously described, in Step S3, the system of this example judges whether or not each of the destinations and locations passed in the journey is the probability-increase/strong-influence location located in any one of: an area (a seismic gap area) for which, up to the present time, an earthquake occurrence probability has increased to not less than a predetermined probability (for example, 0.3) based on estimated strain accumulation along at least one of a plate boundary and a fault due to a period having elapsed since a past occurrence of an earthquake having a predetermined magnitude (a so-called large earthquake); and an area having a risk of being strongly influenced by an earthquake occurrence in the area for which the earthquake occurrence probability has increased. The system judges it from data on a state of chronological changes in an earthquake occurrence probability given for each location, the data being, for example, what is shown in FIG. 3 with respect to the South Kanto area.

Subsequently in Step S4, the system of this example sets a current probability-increase/strong-influence location coefficient C1 for each location of the destinations and areas passed in the journey. As shown in FIG. 6, the system sets the coefficient C1 by obtaining it, for example, in a manner that C1=1.2 at the time in the year 2004, based on a stepwise predetermined function whereby the coefficient C1 increases along an increasing characteristic of an earthquake occurrence probability with respect to a period having elapsed since past earthquake occurrences of each of destinations and locations passed in the journey. Subsequently in Step S5, the system, using the insurance premium rate computation section 4, multiplies the previously set basic premium rate by the probability-increase/strong-influence location coefficient C1 determined in relation to the earthquake occurrence probability in the seismic gap area. Thereby, the system sets a premium rate (or a premium) which, while premising a payout from the government, incorporates marketability. Additionally on this occasion in Step S5, the system displays, on a screen of the display unit, an illustration shown in FIG. 4 or conforming to this drawing, status of the probability shown in FIG. 6, and the like, in order that the applicant can be allowed to purchase the insurance by selecting the following value of the coefficient C1 multiplied to the basic rate. The value of the coefficient C1 is selected from, for example, the values of 1.2 set as above in consideration of the earthquake occurrence probability increase, and 1.0 set without consideration of the earthquake occurrence probability increase. Note that, in a case where there is no room for selection because a premium rate is defined in accordance with a premised insurance system structure, the step may be configured by excluding alternatives and including only a presentation of explanation contents.

After having passed through this step, next, the system of this example, using the traveling time range judgment section 5, obtains, in Step S9, times of moonrises and moonsets, for example, in Akashi as standards for all locations in Japan, by computing them, for example, by using the abovementioned astronomical software ("STELLA NAVIGATOR"). Subsequently in Step S10, the system judges, with respect to each location of the destinations and areas passed in the journey, whether or not the location is included in the seismic gap area and, at the same time, a traveling time range falls within a predetermined time period (for example, as shown in FIG. 9, within a time range when the moon enters in a visual range within plus and minus 40 degrees around 100 degrees west, or within plus and minus 40 degrees around 80 degrees east, from the true north direction) around a moonrise or a moonset in the location, during which an earthquake occurrence possibility increases to not less than a predetermined probability (for example, 1.0). Then, if the traveling time range falls within the time range, an earthquake occurrence probability therefor according to an earthquake occurrence frequency function increases to not less than 0.1. Therefore, by taking the probability increase into consideration, subsequently in Step S11, the system, using the moon influence coefficient setting section 6, sets a value of a moon influence coefficient C2 based on the traveling time range and a visual position of the moon, for example, in a manner that C2=1.5.

A range corresponding to the coefficient C2=1.5 shown in FIG. 9 indicates a case where plus and minus 3 hours around a moonrise or a moonset are taken, and this range is set on the basis of positions around ½ of the maximum value of occurrence frequencies taken for a vertical axis in the drawing, or probabilities of frequencies in relation to the total number of the studied earthquakes. Note that values of the coefficient C2 may be set in plural phases based on a stepwise predetermined function whereby the coefficient C2 decreases along a decreasing characteristic of an earthquake occurrence probability with respect to a periodical distance from each of a moonrise or a moonset. Specifically, in a case of traveling by a Shinkansen train, a function for the moon influence coefficient C2 may be previously set in a manner that values of a boarding time range are set differently depending on where, in FIG. 9, the boarding time range is included.

After setting the value of the above moon influence coefficient C2, in Step S12 in the same manner as previously described with respect to Step S5, the system of this example, using the insurance premium rate computation section 4, multiplies the previously set basic premium rate by the moon influence coefficient C2 determined in relation to the earthquake occurrence probability based on the above influence from the moon. Thereby, the system sets a premium rate (or a premium) which, while premising a payout from the government, incorporates marketability. Additionally on this occasion in Step S12, the system displays, on a screen of the display unit, status of the probability shown in FIG. 9 and the like in order that the applicant can be allowed to purchase the insurance by selecting a value of the coefficient C2 by which the basic premium rate is multiplied. The value of the coefficient C2 is selected from, for example, the values of 1.5 set as above in consideration of the earthquake occurrence probability increase, and 1.0 set without consideration of the earthquake occurrence probability increase. Note that, while insurance payouts and insurance premium rates are presented in the final step in the flow, it is made possible, in the system of this example, to take a route for going back to each of the previous steps in the flow in order that the earthquake occurrence probability at the present time, time ranges of a moonset and a moonrise can be confirmed in accordance with a selected alternative.

As described hereinabove, according to the system of this example, if a location of a house covered by earthquake insurance added to fire insurance is a probability-increase/strong-influence location located in any one of an area for which an earthquake occurrence probability has increased to not less than a predetermined probability based on estimated strain accumulation along at least one of a plate boundary and a fault due to a period having elapsed since a past earthquake occurrence, and an area having a risk of being strongly influenced by an earthquake occurrence in the area for which the earthquake occurrence probability has increased to not less than the predetermined probability, a insurance premium rate where a degree of the probability increase is reflected is computed. Thereby, it is possible to reasonably and effectively set insurance premium rates of earthquake insurance based on evaluations of the earthquake occurrence probability.

What is more, according to the insurance premium rate setting support system of this example, it is possible to automatically and accurately judge, for example, from previously provided data, whether or not a location of a house covered by the earthquake insurance is a probability-increase/strong-influence location located in any one of an area for which an earthquake occurrence probability has increased to not less than a predetermined probability based on estimated strain accumulation along at least one of a plate boundary and a fault due to a period having elapsed since a past earthquake occurrence, and an area having a risk of being strongly influenced by an earthquake occurrence in the area for which the earthquake occurrence probability has increased to not less than the predetermined probability. Furthermore, if a result of the judgment is that it is the probability-increase/strong-influence location, it is possible to set the probability-increase/strong-influence location coefficient C1 in consideration of the intent.

Additionally, according to the insurance premium rate setting support system of this example, if a traveling time range of a journey covered by travel accident insurance is a moon influence time range which is within a predetermined time period around any one of a moonrise and a moonset in a location visited during the traveling, during which an earthquake occurrence probability increases to not less than a predetermined probability, an insurance premium rate, for which the earthquake occurrence probability increase is reflected, is computed. Thereby, it is possible to reasonably and effectively set insurance premium rates of travel accident insurance based on earthquake occurrence probability evaluations.

Moreover, according to the insurance premium rate setting support system of this example, an insurance premium rate where an increase in an earthquake occurrence probability is reflected, and an insurance premium rate where the increase in the earthquake occurrence probability is not reflected, are presented on a screen of the display unit, whereby an insurance purchaser can purchase the insurance with one of the foregoing insurance premium rates, the one being spontaneously selected by the purchaser. What is more, the system offers high convenience for purchasers because it can be applicable to insurance purchase payments through a wide variety of terminal apparatuses.

While the detailed description has been given hereinabove based on the drawings, this invention is not limited to the above described example, and appropriate modifications thereto can be carried out as long as the modifications do not depart from the scope as defined by the attached claims. For example, with respect to whether or not a location covered by earthquake insurance is a probability-increase/strong-influence location, the system may be configured to be one where a representative or the like of an insurance company or a travel agency, who has been informed of the location covered by the earthquake insurance by an applicant, checks that out from a manual, a screen presentation on the display unit, and the like, and designates the intent to the system. Additionally, the system may be one where, instead of performing a multiplication for each case, the insurance premium rate computation section 4 outputs an insurance premium rate by checking that out from a table previously containing computation results.

INDUSTRIAL APPLICABILITY

Thus, according to the insurance premium rate setting support system of this invention, by reflecting increases in earthquake occurrence possibilities due to strain accumulation, by giving a focus on a so far unclear correlation between a visual position and an earthquake occurrence frequency, and by taking them into consideration, it becomes possible to reasonably and effectively set insurance premium rates of earthquake insurance and travel accident insurance. By extension, the system can set more reasonable insurance premium rates, can promote a feeling of security among insured ones as a result of risk aversion, and can contribute to reduction of the financial burden on the government in the mechanism of earthquake insurance in which the government has no other choice but to be concerned.

What is claimed is:

1. A computer system for setting insurance premium rates of travel accident insurance comprising:
    an input unit for a purchaser to input a location and time range of travel to be covered by the travel accident insurance;
    a memory unit for storing information relating to moonrise and moonset times at a plurality of locations; and a basic insurance premium rate; and
    a central processing unit connected to the input unit and the memory unit;
    wherein the central processing unit is programmed:
        to determine when an inputted time range of traveling on a journey to be covered by travel accident insurance falls within plus and minus 3 hours of the moonrise or moonset time at the inputted location and, in response, set a moon influence coefficient of the journey reflecting an increase in an earthquake occurrence rate; and
        to compute an applicable insurance premium rate by multiplying together said set moon influence coefficient and the basis insurance premium rate.

2. The computer system according to claim 1, wherein the memory unit further stores a predetermined function, and the central processing unit sets said moon influence coefficient based on the predetermined function whereby said coefficient progressively decreases with a decrease in the earthquake occurrence rate with respect to a time difference from said one of said moonrise and moonset.

3. The computer system according to claim 1, further comprising: an output unit for outputting the insurance premium rate computed by the central processing unit, wherein the system is configured so as to allow a purchaser of the insurance to purchase the insurance.

4. The computer system according to claim 2, further comprising: an output for outputting the insurance premium rate computed by the central processing unit, wherein the system is configured so as to allow a purchaser of the insurance to purchase the insurance with one of the foregoing insurance premium rates, the one being spontaneously selected by the purchaser.

* * * * *